UNITED STATES PATENT OFFICE.

CHARLES WESLEY DOUGHTY, OF AUGUSTA, GEORGIA.

FERTILIZER.

SPECIFICATION forming part of Letters Patent No. 462,476, dated November 3, 1891.

Application filed June 7, 1888. Serial No. 276,399. (No specimens.)

*To all whom it may concern:*

Be it known that I, CHARLES WESLEY DOUGHTY, a citizen of the United States of America, residing at Augusta, in the county of Richmond and State of Georgia, have invented certain new and useful Improvements in Fertilizers from Sewage and Night-Soil, of which the following is a specification.

My invention relates to a new and useful improvement in the means and proportions of materials used for the disposal and utilization of human excrement to produce a valuable fertilizer nearly inodorous and capable to be transported in bags or other packages.

To obtain this result, I take carbonate of lime obtained by thoroughly grinding and drying limestone or oyster-shells, but preferably natural marl, either of which is dried by natural heat, or, preferably, by artificial heat not exceeding 200° Fahrenheit, sufficient to expel the moisture, but not enough to produce burnt or caustic lime. This carbonate of lime so prepared is either placed in the privy-receptacles to absorb the urine and liquids of the excreta at the time they fall therein, or said carbonate of lime may be placed in the half-filled receptacle after these deposits have accumulated therein, the proportions being about equal weight of carbonate of lime to the weight of the urine and solids, the whole being well mixed and stirred. To this compound is then added from five to fifteen per cent. of the weight of the carbonate of lime of land-plaster that has been dried at a degree of artificial heat of about 175° to 180° Fahrenheit, but not calcined or burned, and consequently containing unimpaired all of its manurial value and not liable to harden or crystallize or to become insoluble as a fertilizer, as is the case in calcined gypsum or plaster-of-paris.

The effects of the dried carbonate of lime upon the excrements are to prevent fermentive changes, preserve its manurial value, and transform the mass in a nearly odorless fertilizer. The sulphate of lime or land-plaster unites with the ammonia and becomes in the best condition to benefit the soil. A still further deodorization is obtained by the addition of a small proportion of ground charcoal or of copperas, or of chloride of lime; but if the latter is used the proportion should not be over one pound per ton of the mixture, as a large quantity may not be decomposed and chlorine is injurious to vegetation.

The above-described absorbents can be mixed with the contents of privy boxes or barrels on the spot where they are in use, or said vessels and contents may first be removed to a suitable location or building conveniently arranged for the mixing. The product is a pulverulent material containing all the fertilizing components of the mixture in a proper state to be absorbed by growing crops.

I am aware that chloride of lime has been used as a disinfectant of fecal matter, but in such large proportions as to render the composition not only useless as a fertilizer, but injurious to growing plants; but I am not aware that it has been combined with unburnt carbonate of lime in the proportion stated.

I am also aware that charcoal and copperas are well-known deodorizers.

I am also aware that calcined or burnt gypsum has been used to absorb and solidify excrements; but it renders them substantially insoluble and impairs their manurial value.

Having now fully described my invention, I claim—

1. A fertilizing compound consisting of dried but ground and unburnt carbonate of lime and human feces in substantially equal proportions in weight, and dried but unburnt gypsum in the proportion of about ten per cent. of the carbonate of lime, substantially as and for the purpose described.

2. A fertilizing compound consisting of dried unburnt marl and human feces in substantially equal proportions in weight, and dried unburnt gypsum in about ten per cent. of the dried marl, and chloride of lime in the proportion of about one pound to a ton of the above mixture, substantially as and for the purpose described.

In testimony whereof I affix my signature in presence of two witnesses.

CHARLES WESLEY DOUGHTY.

Witnesses:
T. S. JONES,
L. I. BLOME.